March 7, 1939. F. C. PICUT 2,149,928
FAUCET
Filed July 12, 1938
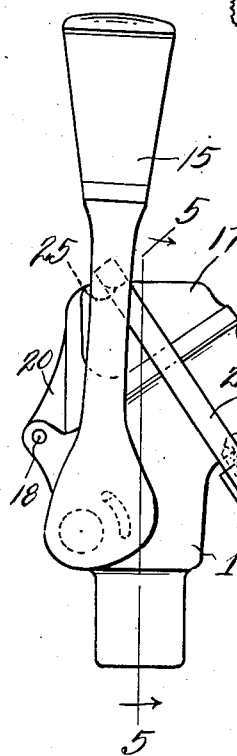
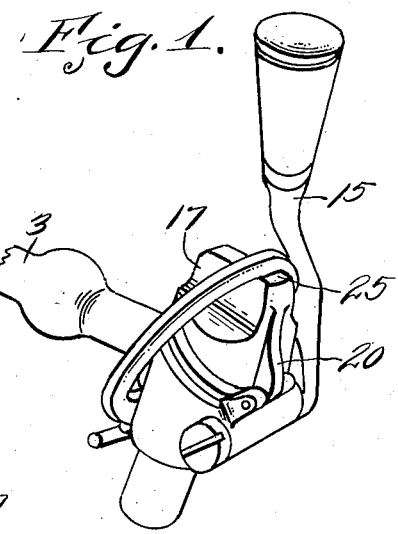
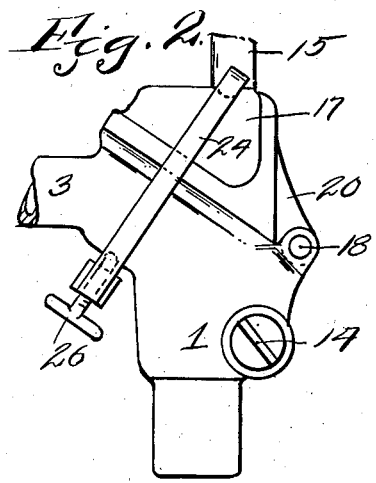
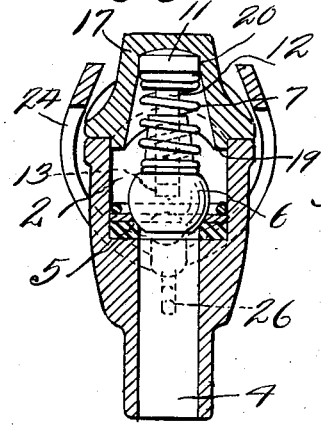
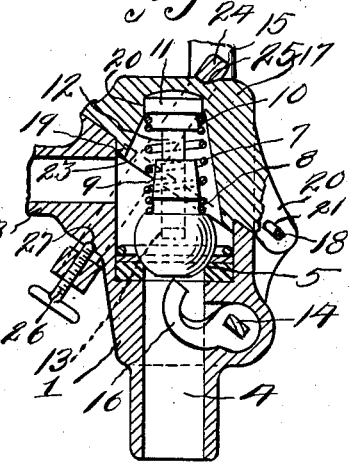
Inventor
Frederick C. Picut
By Philip A. H. Ferrell
Attorney Patented Mar. 7, 1939

2,149,928

UNITED STATES PATENT OFFICE 2,149,928

FAUCET

Frederick C. Picut, Newark, N. J., assignor to Economy Faucet Co., Newark, N. J., a corporation of New Jersey Application July 12, 1938, Serial No. 218,859

7 Claims. (Cl. 251—156)

The invention relates to faucets, and particularly to the casings thereof and has for its object to provide a device of this character wherein the upper end of the casing is hingedly mounted to the body to form an angular split casing, which, when opened, will allow ready access to the intake and discharge ports of the casing for cleaning and repair purposes.

A further object is to provide an angularly disposed yoke arching the hinged portion of the casing and the crotch of the casing and forming means whereby a leak-proof connection may be formed between the casing sections when in closed position.

A further object is to provide one end of the yoke with means cooperating with the casing for forcing the casing sections into close engagement with each other.

A further object is to provide the hinged casing section with a tapered recess on the axis of the casing and in which the upper end of the valve unit is seated. Also to shape the bottom of said recess to receive the upper end of the valve unit and hold the same in inverted position when the hinged section is open so that when said section is moved to closed position the valve unit will be seated.

A further object is to provide the hinged section with a flange extending into the chamber of the body in close engagement therewith and the hinged section with a loose pivotal connection to the body to allow said flange to be received within the chamber of the body.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the faucet.

Figure 2 is a side elevation of the faucet.

Figure 3 is a side elevation of the opposite side of the faucet.

Figure 4 is a vertical longitudinal sectional view through the faucet.

Figure 5 is a vertical transverse sectional view through the faucet, taken on line 5—5 of Figure 3.

Referring to the drawing, the numeral 1 designates the main body of the faucet and 2 a chamber therein. The body 1 adjacent its inner upper side is provided with an intake extension 3, which may be in turn provided with any kind of connecting means for connecting the faucet to a receptacle, for instance a coffee urn. The device is particularly adapted for use in connection with coffee urns where it is necessary to provide means so the faucet can be easily and quickly cleaned by inserting a tool into the intake extension 3 and downwardly through the discharge port 4.

Disposed in the bottom of the chamber 2 is a removable valve seat 5, with which a ball valve 6 coperates. The ball valve 6 is normally seated by means of an expansion spring 7, anchored at 8 to the sleeve 9 of the valve and at 10 to a cylindrical head 11, which cylindrical head is provided with an extension pin 12, which is slidably mounted in the sleeve 9 and valve 6 at 13. This general valve unit is set forth in my application for patent, Serial No. 176,704, filed November 26, 1937. The valve seat structure is also set forth in said application, as well as the mechanism cooperating with the rockable shaft 14 controlled by the handle 15 for raising and lowering the operating arm 16 for a valve seating or unseating operation.

It will be noted that the discharge port and chamber 2 are at a right angle to the intake port portion 3, and when it is desired to clean these ports and chambers it is necessary to insert a cleaning tool at right angular positions, according to the ports being cleaned. It is also essential to provide means whereby the valve unit may be entirely removed from the chamber 2 for the cleaning operation.

To accomplish the cleaning operation above set forth the upper section 17 of the body 1 is hingedly connected at 18 to the forward side of the body below the lower side of the port through the extension 3 and extends angularly upwardly and terminates above the ported extension 3, so that when it is hinged outwardly, access may be readily had to all the ports and the chamber for cleaning purposes, and at the same time the valve stucture, as a unit, may be removed from the chamber 2 for cleaning purposes. In other words the body is angularly split across the point of the axis of both ports. The under angular face of the hinged section 17 is provided with a marginal flange 9, which fits snugly within the chamber 2 and forms substantially a ground connection. It will be noted that the ear 20 of the hinged section 17 is provided with an elongated aperture 21, through which the hinging pin 18 extends, therefore it will be seen that the section may have, at the ends of its closing operation, a slight upward and inward movement to allow the flange 19 to be received within the upper end of the chamber 2.

It will be noted that the cylindrical head 11 of the valve unit is disposed in a cylindrical portion 22 of the chamber 23 within the hinged section 17, and that the portion 20 is axially disposed, hence it will be seen that the valve unit will be axially held during the operation thereof. At the same time it will also be seen that the head 11 fits snugly in the portion 20 and after a cleaning operation the valve unit can be placed in position in the section 17 in inverted position with the section 17 open and upon closing of the section 17 the valve unit will be properly positioned within the chamber 2.

The hinged section 17 is held closed by means of a yoke 24, which encircles angularly the valve body and has its upper portion seated in a transverse recess 25 in the upper side of the section 17, and at its lower end is provided with a set screw 26, which cooperates with a recess 27 in the crotch of the body, therefore it will be seen that by tightening the set screw 26, a close leakproof connection will be formed between the body 1 and the hinged section 17. At the same time, when it is desired to clean the valve, it will only be necessary for the operator to loosen the set screw 26 and to move the yoke rearwardly onto the ported extension 3. It will also be seen that after the faucet is in position on a coffee urn or other receptacle, the yoke can not be removed entirely from the faucet over the front end thereof, hence loss of the yoke is obviated.

From the above it will be seen that a clean-out split body faucet is provided, which is particularly adapted for use in connection with coffee urns, and the device is simply constructed and may be quickly opened.

The invention having been set forth what is claimed as new and useful is:

1. A sectional body faucet having angularly disposed branch intake and discharge portions and a chamber therein, a valve seat in the bottom of said chamber, a spring actuated valve unit cooperating with said seat, means for unseating the valve unit, said valve seat being carried by a main body section, a hinged body section angularly engaging the main body section and extending diagonally across the axis of the intake and discharge portions of the main body portion, said hinged section being hingedly connected to the main body portion at its forward side and an endless clamping yoke extending around the hinged section and a portion of the main body portion at a right angle to the engaging surfaces thereof.

2. A dispensing faucet comprising a body portion, said body portion being in a vertical plane and having angularly disposed intake and discharge passages, said body comprising a main portion and a closure portion having chambers forming the chamber of the faucet when the closure portion is in closed position, seating surfaces carried by said closure portion and main portion and disposed in a downwardly and outwardly inclined plane, the outer side of the closure portion being hingedly connected to the main portion at the lower side thereof at a point below the plane of the intake port whereby when said closure portion is in open position access may be had to the intake port and the chamber of the closure will have its open side upwardly disposed for the reception of a valve unit in inverted position whereby the valve unit will be seated in the main portion upon closing of the closure and means for holding said closure in closed position.

3. A device as set forth in claim 2 including a holding yoke cooperating with the closure and main portion for maintaining the closure in closed position.

4. A device as set forth in claim 2 the closure holding means being carried by the main portion and cooperating with the closure for maintaining the same closed, said holding means imparting pressure on the closure at substantially a central point thereof whereby a uniform seating of the hinged portion is maintained.

5. A split faucet body, said body comprising a main portion having angularly disposed intake and discharge ends, a hinged portion connected to the main portion to the outside of the discharge end, means for holding said hinged portion in closed position, said main and hinged portions having engaging seating surfaces at an angle extending diagonally across the axis of the intake and discharge ends of the main portion, said means for holding said hinged portion in closed position comprising a removable yoke angularly arching the hinged portion at substantially a right angle to the seating surfaces for forcing said hinged portion towards the body portion.

6. A split faucet body, said body comprising a main portion having angularly disposed intake and discharge ends, a hinged portion connected to the main portion to the outside of the discharge end, means for holding said hinged portion in closed position, said main and hinged portions having engaging seating surfaces at an angle extending diagonally across the axis of the intake and discharge ends of the main portion, a flange carried by the hinged portion and adapted to closely engage within a chamber of the main portion and means for allowing side movement of the hinged portion as it reaches closed position for allowing said flange to be received within the chamber.

7. A sectional body faucet having angularly disposed branch intake and discharge portions and a chamber therein, a valve seat in the bottom of said chamber, a spring actuated valve unit cooperating with said seat, means for unseating the valve unit, said valve seat being carried by a main body section, a hinged body section angularly engaging the main body section and extending diagonally across the axis of the intake and discharge portions of the main body portion, said hinged section being hingedly connected to the main body portion at its forward side, means cooperating with the hinged section and main body section for seating the hinged section on the main body section, a flange carried by the hinged section and extending into the chamber of the main section and means for allowing lateral play of the hinged section as it approaches closed position for allowing said flange to be received within the chamber of the main body portion.

FREDERICK C. PICUT.